United States Patent Office 2,839,513
Patented June 17, 1958

2,839,513

FLUORINATED ACRYLATE ESTERS AND POLYMERS THEREOF

Arthur H. Ahlbrecht, Ramsey County, William S. Friedlander, St. Croix County, and Wayne A. Severson, Ramsey County, Minn., assignors to Minnesota Mining and Manufacturing Company, St. Paul, Minn., a corporation of Delaware No Drawing. Application July 25, 1956
Serial No. 599,913

7 Claims. (Cl. 260—86.1)

The invention relates to new and useful fluorinated acrylate esters and their polymers.

More particularly the invention is directed to terminally hydrogenated fluorinated acrylate esters of the class illustrated by 1,1,6-trihydro-4-oxa-perfluorohexyl acrylate which has the formula $$CH_2=CHCOOCH_2C_2F_4OCF_2CF_2H$$

and polymers thereof. The "oxa" prefix signifies that an oxygen atom has replaced a carbon atom in the hexyl skeletal chain.

Others have made fluorinated acrylate esters possessing an "oxa" oxygen and the preparation of such esters, as well as their homopolymers and copolymers, is described and claimed in copending application Serial No. 640,348, filed February 15, 1957, now U. S. Patent No. 2,826,564 as a continuation-in-part of copending application Serial No. 399,568, now abandoned, Joseph F. Abere and Frank A. Bovey, filed December 21, 1953. In that application, 1,1-dihydro-4-oxa-perfluoroalkanols (also called 3-perfluoroalkyl-1,1-dihydroperfluoropropyl alcohols), $F(CF_2)_nOCF_2CF_2CH_2OH$, wherein $n$ is an integer from 1 to 4, are reacted with acrylic acid, or the like in the formation of acrylate esters.

As will be noted, the only hydrogen atoms attached to carbon atoms in the alcohols employed in the copending Abere and Bovey application above referred to are those in the 1,1-position to the hydroxyl group. All of the other carbon linkages of said alcohols not satisfied by the skeletal chain or the hydroxyl group are satisfied by fluorine atoms exclusively.

We have discovered that novel terminally hydrogenated fluorinated acrylate esters can be made from a fluorinated oxa-alcohol in which a hydrogen atom replaces a fluorine atom on the terminal carbon of the alcohol skeletal chain. Thus, 1,1,6-trihydro-4-oxa-hexanol, which has the formula $HCF_2CF_2OC_2F_2CH_2OH$, can be reacted successfully to provide high yields of the corresponding acrylate, 1,1,6-trihydro-4-oxa-perfluorohexyl acrylate. The acrylate ester is a polymerizable monomer capable of homopolymerization as well as copolymerization with butadiene and other monomers to produce rubbery and other desirable vulcanizable polymers having many of the properties and uses of the chemically different polymeric products of the copending Bovey and Abere application previously referred to. Further, the formation of the ester monomer and subsequent polymers can be carried out without disruptive splitting out of HF.

It is an object of the invention, therefore, to provide a new type of fluorinated acrylate ester and a new route for the preparation thereof. A further object of the invention is to provide a new and desirable intermediate for making vulcanizable rubbery and other polymers. Other objects and advantages will become apparent as the description proceeds.

The present invention, for the first time, makes available a fluorinated acrylate ester monomer which possesses both an oxa-oxygen and a terminal hydrogen. Among the desirable properties conferred by this combination are included flexibility at low temperatures and good oil resistance; the former property probably being due to greater ease of rotation and/or greater flexibility at the knee formed in the chain by the oxygen atom. Although the terminal hydrogen makes oil resistance less than in the corresponding terminally perfluorinated acrylates of the Bovey and Abere application, supra, this loss is offset by the provision of a new route for the preparation of vulcanized rubbers and the like possessing the properties conferred by the oxa-perfluoroalkyl chain.

The 1,1,6-trihydro-4-oxa-perfluorohexyl acrylate monomer is obtained from the product of the electrochemical fluorination of 4-oxa-heptane-1,7-dioic acid difluoride. The perfluorination and subsequent steps are illustrated by the following equations:

$$F-CO-CH_2-CH_2-O-CH_2-CH_2-CO-F \xrightarrow{HF\ +\ (e)}$$

$$F-CO-CF_2-CF_2-O-CF_2-CF_2-CO-F \xrightarrow{NaOH}$$

$$NaOOC-CF_2-CF_2-O-CF_2-CF_2-COONa \xrightarrow{H_2SO_4}$$

$$HOOC-CF_2-CF_2-O-CF_2-CF_2-COOH \xrightarrow{Piperdine}$$

$$H-CF_2-CF_2-O-CF_2-CF_2-COOH$$

The illustrated steps, as well as further steps relating to the making of the lower alkyl esters of the final mono acid, are set forth in detail in the copending application, Serial No. 579,730 filed April 23, 1956 of William S. Friedlander, one of the coinventors in this application. The monoacid, $HCF_2CF_2OC_2F_4COOH$, called omega-hydroperfluoroethoxypropionic acid in aforementioned copending application, following the nomenclature of the present application can be called 6-hydro-4-oxaperfluorohexanoic acid. From the lower alkyl esters of this acid, the starting alcohol for the production of the fluorinated acrylate monomer of this invention can be readily prepared in the manner illustrated by the reduction of the methyl ester of the acid as follows:

$$H-CF_2-CF_2-O-CF_2-CF_2-COOCH_3 \xrightarrow{LiAlH_4}$$

$$H-CF_2-CF_2-O-CF_2-CF_2-CH_2OH$$

The 1,1,6-trihydro-4-oxaperfluorohexyl alcohol, which is in itself a heretofore unknown alcohol, reacts with acrylic acid, or acrylyl chloride to produce the 1,1,6-trihydro-4-oxaperfluorohexyl acrylate of this invention.

The polymers, both homopolymers and copolymers, prepared from this monomer are characterized by the presence in the skeletal chain of repetitive units:

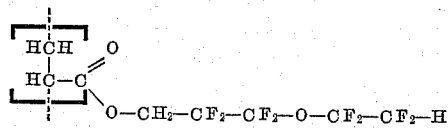

The homopolymer contains these repetitive units attached to one another by the valence bonds shown unattached in the above formula; copolymers contain these groups interspersed with groups derived from the comonomers such as butadiene, styrene, vinyl esters, acrylate esters and the like. So far as is known, there is no tendency for these polymers to be of regular array in the sense that the ester side-chain is regularly disposed throughout the backbone of the polymer on alternate carbon atoms or, in the case of copolymers, at other regular intervals. Stated in another manner, this repetitive unit is not known or believed to be polarized as it combines to form polymers.

The production of the acrylate, polymers and vulcanized rubbers therefrom is illustrated by the following examples.

EXAMPLE 1

The methyl ester of 6-hydro-4-oxaperfluorohexanoic acid (also called omega-hydroperfluoroethoxypropionic acid), was prepared in the following manner:

A mixture of 24 g. (0.24 mole) of concentrated sulfuric acid and 7.7 g. (0.24 mole) of analytical grade methanol was prepared in a dry 150 cc. 1-necked round bottom flask by adding the methanol very cautiously to the sulfuric acid contained in the flask, and cooling intermittently to remove the heat liberated. To this mixture was then added 30.5 g. (0.123 mole) of 6-hydro-4-oxaperfluorohexanoic acid ($HCF_2CF_2OC_2F_2COOH$). The reaction to form the methyl ester proceeded without liberation of significant amounts of heat or requiring heating other than that furnished during the isolation. The isolation was effected by arranging the flask for distillation at reduced pressure in the usual fashion using a water cooled condenser and distilling and collecting the fraction of about 25 g. boiling between 65° and 70° C. at about 50–60 mm. This fraction was fractionally redistilled through a 10 equivalent plate "Heli-Pak" (inert helical metal packing, a product of the Podbielniak Company) column to give 24 g. of the methyl ester, $HCF_2CF_2OC_2F_4COOCH_3$, a colorless liquid boiling at 124–130° C. at 740 mm.; the yield was 75% of theory.

This methyl ester was reduced to 1,1,6-trihydro-4-oxaperfluorohexanol $$HCF_2-CF_2-O-CF_2-CF_2-CH_2-OH$$

by reaction with lithium aluminum hydride in absolute ether as follows. A three-necked, one liter, round bottom flask and the attachments needed, namely a stirrer, reflux condenser, dropping funnel and gas inlet tube, were dried thoroughly at 120° C. and then assembled so that a stream of dry nitrogen was always present in the apparatus during cooling and assembly. A sufficiently strong stream of nitrogen was maintained so that drying tubes were unnecessary at open parts of the equipment. The flask was so arranged that a cooling bath could be raised to cool it as needed.

After the flask had cooled, 400 cc. of absolute ether, dried over sodium metal (or suitably also distilled from a Grignard reagent or metallic hydride), was placed in it. Using suitable precautions such as face shields, gloves, and explosion-resistant barricades, 3.5 g. (0.0915 mole) of pulverized lithium aluminum hydride was prepared and transferred to the flask containing absolute ether.

The suspension was stirred for about an hour so that the lithium aluminum hydride dissolved with the exception of a small residual content of insoluble impurities. The cooling bath was raised into position, stirring was maintained and to this solution, 24 g. (0.0915 mole) of the methyl ester prepared above dissolved in 100 cc. absolute ether was added through the dropping funnel at such a rate that the refluxing of the ether was moderate. The dropping funnel finally was rinsed with a small further amount of absolute ether to avoid loss of material. After stirring for about 30 minutes, about 10 cc. methanol was added cautiously to decompose the complexes present, followed by addition of about 200 cc. of 10% aqueous sulfuric acid to dissolve lithium and aluminum compounds as the sulfates. The layers were separated, the aqueous layer washed twice with about 50 cc. portions of ether (ordinary solvent grade), the ethereal solutions combined and the aqueous layer discarded. The ethereal solution was concentrated so that ultimately the residual alcohol was in a 50 cc. round bottom flask from which it was distilled to give about 17.5 g. of the desired alcohol, 1,1,6-trihydro-4-oxaperfluorohexanol $$HCF_2-CF_2-O-CF_2-CF_2-CH_2OH$$

boiling at 133–138° C. at 740 mm.

The 1,1,6-trihydro-4-oxaperfluorohexanol was converted to the acrylate by a process involving converting it to the monosulfuric ester and interchange with acrylic acid liberating sulfuric acid as follows:

A total of 17.5 g. alcohol (0.075 mole) was placed in a 50 cc. one-necked round bottom flask fitted with drying tube and to this flask cooled to a temperature of about 10° C., was added with shaking, cautiously and in small portions, a total of 6.0 g. (0.075 mole) of stabilized liquid sulfur trioxide, (available commercially as "Sulfan," a product of the General Chemical Division of Allied Chemical and Dye Corporation). If cooling is stronger than this there is a tendency for the sulfur trioxide to crystallize. The mixture was permitted to stand overnight, although a shorter time is adequate, and 5.4 g. (0.075 mole) of glacial acrylic acid $$(CH_2=CH_2-COOH)$$

was added and the reaction mixture distilled under reduced pressure. About 18.5 g. crude material was collected boiling at 60–70° C. at about 10 mm. This was twice washed with 30 cc. portions of water and redistilled. A fraction of 15.5 g. boiling 65–66° C. at 10 mm. was collected as the product, 1,1,6-trihydro-4-oxaperfluorohexyl acrylate:

$$CH_2=CH-CO-O-CH_2-CF_2-$$
$$CF_2-O-CF_2-CF_2H$$

|   | Calculated, percent | Found, percent |
|---|---|---|
| C | 31.8 | 31.7 |
| F | 50.3 | 50.2 |

$n_D^{25}=1.3379$

Polymer preparation

The 1,1,6-trihydro-4-oxaperfluorohexyl acrylate monomer was polymerized in the presence of persulfate in ampoules as follows. Each of three 5 cc. ampoules was charged with 2 g. monomer, 3.6 g. water, 60 mg. "Duponol ME" (a du Pont product composed of sodium lauryl sulfate) and 5 mg. potassium persulfate. After freezing the contents, the air in each ampoule was removed by evacuation at $10^{-3}$ mm.; the contents were then melted; and, the freezing and evacuating sequence of operations, referred to as degassing, was repeated. This minimizes such side reactions as oxidation during polymerization. The ampoules were sealed while still under vacuum, shaken vigorously and placed in a water bath maintained at 50° C. The ampoules were held at this temperature in the water bath for 2¾ hours with continued shaking. The ampoules were then cooled, opened, and the light colored, rubber-like latex pooled and coagulated by dilution with about 2 volumes of water followed by freezing, melting and collecting the polymer. After washing the coagulated polymer, it was dried. From the 6.0 g. monomer, 5.9 g. polymer was isolated.

A 0.5 g. sample was utilized to measure intrinsic viscosity $[\eta]$, by which is meant the mathematical equivalent:

$$\frac{\log e\ Nr}{C}$$

where $Nr$ is the viscosity of a dilute (e. g. 0.5%) solution of the polymer in a suitable solvent at a convenient temperature (e. g. 25° C.) divided by the viscosity of the same solvent in the same units at the same temperature and $C$ is the concentration in grams of polymer per deciliter of solution. This value is roughly proportional to the molecular weight of a solute for a given solvent, and was determined for the polymer in a solvent consisting of 2 parts acetone and 1 part methyl perfluorobutyrate to be 2.68. The proportionality constant to give molecular weight was not determined.

Vulcanization

A 1.8 g. portion of the polymer was vulcanized by mixing intimately on a micro rubber mill with 0.1205 g. sodium silicate nonahydrate and 49 mg. calcium hydroxide, followed by heating for 3 hours at 155° C. (310° F.) in a mold. The rubbery material was tested for stiffness ($T_{10}$) (ASTM Procedure D1053–54T) and brittleness ($T_B$) (ASTM Procedure D746–54T) and for swelling in solvents (ASTM Procedure D471–49T, Method B). The $T_{10}$ value represents the temperature at which the stiffness is ten times that at room temperature (25° C.). This was found to be −39° C., an exceedingly low value of very great significance indicating excellent low temperature properties. The $T_B$ value, representing the temperature at which the material becomes brittle, was −48° C. Swelling values were:

| | | |
|---|---|---|
| Benzene | 27% | 48 hours at room temperature. |
| Acetone | 446% | Do. |
| Isooctane-toluene (70:30) | 3.7% | Do. |
| Isooctane | 3.9% | Do. |
| Water | 330% | 70 hours at 100° C. |
| Penola turbo oil #15 (a synthetic lubricant based on di-(2-ethylhexyl)sebacate). | −26% | 98 hours at 350° F. (177° C.). |

The resistance to hydrocarbons is outstanding, the lack thereof to water reflects this method of curing, which is commonly used because of convenience, although well-known not to be the best possible. The rubber became stiff and black and shrank in the last test because of the very stringent conditions.

EXAMPLE 2

The reactions of this example were carried out in substantially the same manner as set forth in Example 1 using somewhat larger quantities and larger flasks with similar results. The methyl ester was prepared from 105 g. (0.4 mole) of 1,1,6-trihydro-4-oxaperfluorohexanoic acid, 60 g. (0.6 mole) of sulfuric acid and 25 g. (0.8 mole) of methanol. Although the proportions are somewhat different from those of Example 1, the same procedure for reaction was employed. The product was 100 g. crude ester which was distilled from 5 g. phosphorus pentoxide to remove alcohol and water, and the lower boiling fraction was further redistilled twice from similar portions of $P_2O_5$ to give a total of 68.5 g. of the desired methyl ester boiling at about 125–131° C. at 745 mm. pressure.

This methyl ester, 68.5 g. (0.25 mole) was reacted with 7.6 g. (0.2 mole) of lithium aluminum hydride in about 300 cc. absolute ether by the technique described hereinbefore. It is to be noted that, at least theoretically, 0.2 mole of lithium aluminum hydride should be sufficient to reduce 0.4 mole of ester according to the reaction:

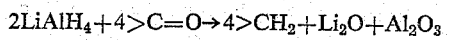

$$2LiAlH_4 + 4 >C=O \rightarrow 4 >CH_2 + Li_2O + Al_2O_3$$

This is, of course, the formal equation (since actually the oxides are not formed but rather hydroxides, methoxides or salts) but it expresses the reduction reaction involved. Practically it is usually found desirable to have an excess of lithium aluminum hydride present as in these examples.

This reaction product was fractionated to give a main fraction of the desired 1,1,6-trihydro-4-oxa-hexanol weighing 47 g. boiling at 745 mm. at 135–136° C., with $n_D^{25}=1.3082$. Examination by infrared spectroscopy confirmed the postulated structure.

This was converted to the acrylate by the procedure described by Codding et al. on page 518 of volume XV, "Journal of Polymer Science," in the following manner: In a 250 cc. round bottomed flask with 3 necks in which were arranged a reflux condenser, stirrer and a dropping funnel and a thermometer suspended through the condenser was placed 13.6 g. (0.189 mole) glacial acrylic acid and about 200 mgm. of hydroquinone as a polymerization inhibitor. The flask was cooled in an ice bath, stirring commenced and 45 g. of trifluoroacetic anhydride was added through the dropping funnel at such a rate that the temperature of the mixture could be maintained at 15° C. or lower. This amount of anhydride consists of 0.189 mole plus an excess sufficient to react with about 0.5 g. water presumed to be present in the alcohol. A few minutes after the end of the addition of anhydride, the temperature of the reaction mixture began to drop and addition of the 1,1,6-trihydro-4-oxaperfluorohexanol (47 g., 0.189 mole) was commenced and continued as rapidly as possible without the temperature's rising above 30° C.

The reaction mixture was stirred for a few minutes after the addition was completed, the stirrer shut off, the cooling bath removed and the mixture permitted to stand at about 20–25° C. for about 2 hours. Agitation was again started and the contents cooled to about 10 to 15° C. by means of a cooling bath. The reaction mixture was then diluted by cautious addition of about 100 cc. ice water at a rate such that the temperature in the flask remained below about 15° C. This precaution is necessary because of the heat of dilution of the trifluoroacetic acid. The reaction mixture was poured into a 500 cc. separatory funnel, the mobile lower organic layer removed and the aqueous layer discarded. The organic layer was washed three times with approximately 50 cc. portions of water, the washes all being discarded. The washed organic layer, comprising 1,1,6-trihydro-4-oxaperfluorohexyl acrylate, was placed in a 100 cc. distilling flask containing small amounts of copper wire and hydroquinone as inhibitors and distilled under reduced pressure. After removing foreruns totalling about 12 g., comprising mostly recovered alcohol, the bulk of the product distilled as a colorless liquid at 83° C. at about 28 mm., a refractive index of $n_D^{24.5}=1.3386$. The yield was 36.5 g. and the physical properties agreed satisfactorily with the same product obtained by the somewhat different procedure described in the previous example.

EXAMPLE 3

1,1,6-trihydro-4-oxaperfluorohexanoic acid was converted to the ethyl ester by azeotropic removal of the water formed during esterification in the following manner. A one-necked 500 ml. round bottom flask was fitted with an efficient fractionating column and a take-off head with a water cooled condenser. In the flask were placed 170 g. (0.65 mole) of the acid, 81.7 g. absolute ethanol and 160 g. reagent grade benzene. The addition of an acidic catalyst is not necessary. The mixture was heated and distilled very slowly through the column so that the ternary azeotrope consisting of about 7.4% water, 74.1% benzene and 18.5% ethanol and boiling at 65° C. was collected, thus removing the water formed in the reaction and forcing the reaction toward completion. After the vapor temperature of the distillate at the head of the column reached about 68.2° C., indicating distillation of the binary azeotrope and no appreciable further formation of water, the heating was continued and the material distilled more rapidly to a vapor temperature of 131° C. Titration showed that 6.5% free acid remained in the 176.2 g. of residual ester. This was removed by washing the ester with 100 cc. of a 4% solution of sodium carbonate, the resulting ester being 163.5 g. From the washes and foreruns about 18 g. of crude sodium salt of the acid was recovered by evaporation.

By substantially the procedure described in the preceding examples, 157.2 g. of this ethyl ester dissolved in 150 cc. absolute ether was reacted with 11.8 g. lithium aluminum hydride in 600 cc. of absolute ether. The reaction mixture was hydrolyzed with 413 g. of 20% aqueous sulfuric acid, the ethereal layer separated and the aqueous layer twice extracted with 100 cc. portions of ether. The ethereal solution and washes were combined, the ether distilled off and the residue fractionated through a 25 cm. column packed with "Pyrex" glass helices. The main fraction of 110 g. constituting the 1,1,6-trihydro-4-oxaperfluorohexanol boiled at 134–137° C. and a further 11 g. of this same product was obtained from the foreruns and holdup of the first distillation.

This 1,1,6-trihydro-4-oxaperfluorohexanol was converted to 1,1,6-trihydro-4-oxaperfluorohexyl acrylate by the procedure of Example 1 as follows. In a 3-necked 250 cc. flask fitted with reflux condenser, stirrer and dropping funnel with thermometer suspended through the condenser were placed 100 g. (0.4 mole) of the alcohol which was then stirred and cooled to below 20° C. The sulfur trioxide (33.6 g. 5% excess over 0.4 mole) was added from the dropping funnel maintaining the temperature below 20° C. After the addition was complete, the mixture was stirred one hour and then 28.8 g. (0.4 mole) glacial acrylic acid containing 0.1 g. hydroquinone as a stabilizer was added to the flask dropwise over about 30 minutes. The flask was then arranged for distillation and the acrylate ester distilled rapidly from the residual sulfuric acid at 10 mm. to give 103 g. crude product. This product was again distilled at 10 mm. from 0.1 g. hydroquinone, the forerun being rejected, to give 94.5 g. of the desired acrylate ester boiling at 58–60° C. at 10 mm., and exhibiting a refractive index of $n_D^{23.5} = 1.3385$ identical with the products of prior examples.

EXAMPLE 4

The acrylate of Example 2 was emulsion polymerized as in Example 1 by placing 5.0 g. in a 25 cc. ampoule with 9.16 g. of an aqueous solution prepared from 90 parts water, 1.5 parts "Duponol ME" and 0.125 part potassium persulfate. The mixture was frozen, evacuated, melted, then frozen, evacuated and sealed after which the ampoule was placed in a water bath at 50° C. and shaken for about 2½ hours. The tube was cooled and opened. The latex was diluted with 2 volumes of water, frozen to coagulate the polymer, melted, and the coagulated polymer washed three times with water. It was dried overnight in vacuum at 40° C. The yield was 92% from the monomer. Similar results were obtained using double the quantities and four 10 g. portions of monomer as prepared in Examples 2 and 3, containing progressively higher amounts of acrylic acid were emulsion polymerized in this manner without observable significant effect either on yields or intrinsic viscosities. The four 10 g. portions contained respectively 0.05% (contained in the monomer normally as impurity), 0.15%, 0.30% and 0.60% acrylic acid so that the polymers formed therefrom are, strictly speaking, copolymers. Evaluation of these is given in Examples 5 and 6 below.

Elastomers prepared above other than the four 10 g. portions and containing no added acrylic acid were subjected to a series of comparative evaluation tests by compounding, molding and testing. The compositions used, source of rubbery polymer and proportions by weight of ingredients, were as follows:

| | AA | A | B | C | D |
|---|---|---|---|---|---|
| Rubbery Polymer | 100 | 100 | 100 | 100 | 100 |
| "Philblack O" (Carbon Black) (Phillips Petroleum Co.) | 35 | 35 | 35 | 35 | 35 |
| Sulfur | 1 | 1 | 1 | 1 | 1 |
| Triethylene Tetramine | 1 | 1.0 | 1.0 | 1.25 | 1.5 |

Samples AA and A were prepared from batches of polymer different from that used for B, C and D.

Each sample of elastomer was milled at 140° F. (60° C.) for about 5 minutes to insure that the sample was dry and then weighed out with the other ingredients in the specified proportions. The rubbery polymer was first milled with the "Philblack O" to homogeneity at about 150° F., then cooled to about 80° F. and milled with the other ingredients to homogeneity. The milled material was molded and cured at 310° F. (155° C.) for 30 minutes, in forms adapted to give test pieces.

Samples AA and A were tested for swelling by solvents by ASTM Procedure D471–49T, Method B. These values should be compared with those recited in Example 1 for similar samples in which a silicate cure was employed. The results obtained were:

| | Swelling, percent | | Conditions |
|---|---|---|---|
| | AA | A | |
| 70:30 Isooctane-Toluene | 16 | 13 | 48 hrs., 77° F. (25° C.) |
| Benzene | 34 | 32 | Do. |
| Acetone | 330 | 636 | Do. |
| Ethyl Acetate | 345 | 391 | Do. |
| 10% sodium hydroxide | 6 | 197 | Do. |
| Water | 64 | 67 | 70 hrs., 212° F. (100° C.). |

Stiffness and brittleness were also determined as described above on samples AA and A and found to be the temperatures (°F.) indicated for the respective increases in stiffness:

| Increase | Fivefold ($T_5$) | Tenfold ($T_{10}$) | Hundred-fold ($T_{100}$) | Brittle Point ($T_B$) |
|---|---|---|---|---|
| AA | −16.6 | −23.8 | −38.2 | −39 |
| A | −6.7 | −16.6 | −32.8 | −35 |

Elastic properties were measured on an Instron Tester to determine the tension in pounds per square inch at which there was increase in length of specimen of 100, 200 and 300 percent. These are designated respectively as $F_{100}$, $F_{200}$ and $F_{300}$. In addition, the tension (T) and elongation (E), expressed respectively in pounds per square inch and in percent, at which breaking of the sample occurred and irreversible elongation or set (as percent) were determined for all four samples, and additionally for samples AA and A after aging in air for 100 hours at 350° F. (174° C.) (4.4 to 4.8% loss of weight) and also after aging for 100 hours at 400° F. (205° C.) in "Penola" turbo oil (a lubricant based on di-(2-ethylhexyl) sebacate) (attended by a 3–6% increase in volume). These data are presented in the following table; numerical designations, except for percent set, are in pounds per square inch.

| Sample | $F_{100}$ | $F_{200}$ | $F_{300}$ | T | E | Percent Set |
|---|---|---|---|---|---|---|
| AA | 240 | 570 | | 900 | 300 | |
| A | 150 | 300 | 570 | 650 | 340 | 13 |
| AA (air aged) | 170 | 240 | | 250 | 220 | 13 |
| A (air aged) | 140 | | | 160 | 170 | 15 |
| AA (oil aged) | 250 | | | 320 | 140 | 6 |
| A (oil aged) | 190 | | | 250 | 150 | 21 |
| B | 280 | 610 | | 780 | 250 | 9 |
| C | 400 | | | 880 | 195 | 6 |
| D | 420 | | | 880 | 185 | 3 |

EXAMPLE 5

Copolymers of 1,1,6-trihydro-4-oxaperfluorohexyl acrylate with 1,1-dihydro-4-oxaperfluorohexyl acrylate $$(C_2F_5-O-C_2F_4-CH_2-O-CO-CH=CH_2)$$

were prepared by the emulsion polymerization process described above. For purposes of convenience in this example the above monomers are designated respectively as H and F. Employing the same proportion of total monomer to aqueous solution detailed above, copolymers were prepared comprising about 75% H and 40% H, the respective remainders of 25% and 60% being F. The reaction was slower than in the case of the homopolymer and required 6½ hours at 50° C. and the intrinsic viscosities were quite low, indicating rather lower molecular weights than obtained for the monomer. It was postulated that this was due to the presence of a contaminant of undetermined type in F which acted adversely on the polymerization.

Evalutions of the two copolymers describe above, designated as A and B respectively in the tables below, and the copolymer of Example 4 containing 0.15% acrylic acid, designated as C in the table below, were performed as outlined above for homopolymers. Specimens were cured by the same procedures as before and tested, giving results shown below, the tests being those described above. The data for the homopolymer, designated as D in the table below, are those of AA from Example 1.

I. ASTM PROCEDURE D1053–54T AND D746–54T
[Numerical designations are temperatures in °F.]

|   | $T_5$ | $T_{10}$ | $T_{100}$ | $T_B$ |
|---|---|---|---|---|
| A | +8.6 | −9.4 | −31 | −35 to −38 |
| B | −6.7 | −16.6 | −45.4 | −24 to −27 |
| C | +5 | −11.2 | −34.6 | −35 |
| D | −16.6 | −23.8 | −38.2 | −39 |

II. ASTM PROCEDURE D471–49T, METHOD B
[Numerical designations denote percent swelling]

|   | A | B | C | D | Time and Temperature |
|---|---|---|---|---|---|
| 70:30 Isooctane Toluene | 18 | 19 | 18 | 16 | 48 hrs. at 77° F. |
| Benzene | 18 | 31 | 35 | 34 | Do. |
| Acetone | 33 | 108 | 231 | 330 | Do. |
| Ethyl Acetate | 39 | 139 | 254 | 345 | Do. |
| 10% Sodium Hydroxide | 4 | 6 | 5 | 6 | Do. |
| Water | 52 | 47 | 37 | 64 | 70 hrs. at 212° F. |

III. TENSILE DATA
[lbs./sq. in.]

|   | $F_{100}$ | $F_{200}$ | $F_{300}$ | T | E | Percent Set |
|---|---|---|---|---|---|---|
| A | 140 | 225 | 315 | 380 | 400 | 25 |
| B | 200 | 380 |  | 580 | 300 | 13 |
| C | 220 | 510 |  | 740 | 280 | 6 |
| D | 240 | 570 |  | 900 | 300 |  |
| A (air aged) | 100 |  |  | 100 | 130 | 24 |
| B (air aged) |  |  |  | 140 | 60 | 6 |
| C (air aged) | 170 |  |  | 290 | 200 | 3 |
| D (air aged) | 170 | 240 |  | 250 | 220 | 13 |
| A (oil aged) | 190 |  |  | 235 | 170 | 21 |
| B (oil aged) |  |  |  | 210 | 70 | 12 |
| C (oil aged) |  |  |  | 240 | 90 | 6 |
| D (oil aged) | 250 |  |  | 320 | 140 | 6 |

It is to be noted that the copolymers have increased resistance to water, acetone and ethyl acetate although not quite so good in low temperature properties or tensile strength as the homopolymer. This is probably due at least in part to the contamination of the comonomer postulated hereinbefore.

EXAMPLE 6

Copolymers prepared in Example 4 with small amounts of added arcylic acid were evaluated by a series of tests as described in above examples. The four samples designated I, II, III and IV were respectively the homopolymer containing about 0.05% acrylic acid as an impurity and copolymers containing 0.15%, 0.30% and 0.60% acrylic acid. Each was compounded with "Philblack 0," sulfur and triethylene tetramine in the proportions and manner described in Example 4, except about 40 parts of carbon were included in compounding Sample III. Each sample was cured for 30 minutes at 310° F. (155° C.).

(The data secured for the respective samples by the tests indicated were:

| Test | I | II | III | IV |
|---|---|---|---|---|
| Hardness: Shore Durometer A2— |  |  |  |  |
| As prepared | 52 | 53 | 77 | 71 |
| Further cured 24 hrs. at 300° F. | 63 | 70 | 85 | 81 |
| Compression: Set B (70 hrs. at 212° F.) percent | 12 | 21 | 34 | 27 |
| Flexibility (Gehman) ASTM D1053–54T in ° F.: |  |  |  |  |
| $T_2$ | 30 | 13 | 24 | 16 |
| $T_5$ | −5 | −10 | −10 | −18 |
| $T_{10}$ | −16 | −20 | −20 | −26 |
| $T_{100}$ | −38 | −36 | −36 | −49 |
| Brittleness (Scott) ASTM D746–54T in ° F.: |  |  |  |  |
| $T_B$ | −28 | −29 | −26 | −33 |
| Volume Swell—ASTM Procedure D471–49T, Method B, 48 hours in: |  |  |  |  |
| 70:30 isooctane:toluene (70° F.) | 17.2 | 7.8 | 6.3 | 2.6 |
| Benzene (70° F.) | 24.6 | 25.2 | 21.2 | 26.0 |
| Acetone (70° F.) | 220 | 205 | 154 | 162 |
| Ethyl Acetate (70° F.) | 279 | 206 | 167 | 169 |
| Water (212° F.) | 20.4 | 14.4 | 11.1 | 17.9 |

Tensile data were obtained on an Instron tester as described in Example 4, triplicate runs being averaged to give the data on unaged samples and duplicate on the aged samples.

| Treatment | Sample | Wt. Loss, Percent | $F_{100}$ | $F_{200}$ | $F_{300}$ | T | F, Percent | Set At Break, Percent |
|---|---|---|---|---|---|---|---|---|
| Unaged | I |  | 200 | 490 | 850 | 900 | 310 | 8 |
|  | II |  | 320 | 760 |  | 910 | 230 | 6 |
|  | III |  | 550 |  |  | 780 | 150 | 16 |
|  | IV |  | 720 |  |  | 720 | 110 | 6 |
| Oil Aged | I |  | 170 | 330 |  | 360 | 205 | 11 |
|  | II |  | 330 |  |  | 330 | 105 | 6 |
|  | III |  |  |  |  | 370 | 75 | 11 |
|  | IV |  |  |  |  | 470 | 50 | 6 |
| Air Aged | I | 3.7 | 130 | 170 |  | 190 | 245 | 37 |
|  | II | 4.4 | 240 |  |  | 320 | 160 | 19 |
|  | III | 5.3 |  |  |  | 280 | 40 | 12 |
|  | IV | 6.4 |  |  |  | 290 | 45 | 6 |

It is to be noted that the presence of increasing amounts of acrylic acid results in a faster curing composition.

The examples set forth the formation of the ester from acrylic acid. However, other equivalent acrylic acid materials can be used, such as acrylyl chloride and the like. For example, 1,1,6-trihydro-4-oxaperfluorohexylmethacrylate, and polymers thereof can be prepared from methacrylic acid following the procedures of the examples. These methacrylates, in general give less rubbery polymers which have higher softening points than do the esters prepared from acrylic acid.

Also as noted previously, copolymers may be prepared with butadiene, styrene, vinyl esters, other acrylate esters and the like.

Other minor modifications and changes which fall within the purview of the invention will occur to those skilled in the art.

We claim:

1. The compound 1,1,6-trihydro-4-oxaperfluorohexyl acrylate having the formula:

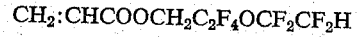

$$CH_2:CHCOOCH_2C_2F_4OCF_2CF_2H$$

2. Homopolymers having a skeletal chain composed essentially of fluorinated acrylate ester units indicated by the formula:

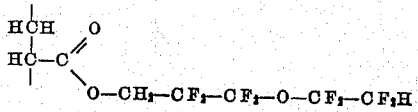

3. Rubbery polymers having a skeletal chain containing fluorinated acrylate ester units indicated by the formula:

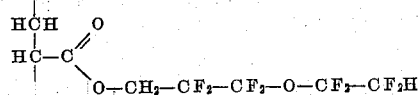

4. Vulcanized rubbery polymers having a skeletal chain containing fluorinated acrylate ester units indicated by the formula:

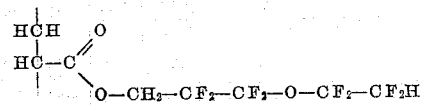

5. Copolymers of 1,1,6-trihydro-4-oxaperfluoroacrylate monomers having the formula:

$$CH_2{:}CHCOOCH_2CF_2CF_2OCF_2CF_2H$$

and at least one other unsaturated monomer copolymerizable therewith.

6. Copolymers of 1,1,-dihydro-4-oxaperfluorohexyl acrylate monomers having the formula:

$$CH_2{:}CHCOOCH_2CF_2CF_2OCF_2CF_3$$

with 1,1,6-trihydro-4-oxaperfluorohexyl acrylate monomers having the formula:

$$CH_2{:}CHCOOCH_2CF_2CF_2OCF_2CF_2H$$

7. Copolymers of acrylic acid and 1,1,6-trihydro-4-oxaperfluorohexyl acrylate monomer having the formula:

$$CH_2{:}CHCOOCH_2C_2F_4OCF_2CF_2H$$

where the amount of acrylic acid is less than 1% by weight of the acrylate monomer.

References Cited in the file of this patent
UNITED STATES PATENTS 2,642,416   Ahlbrecht et al. _____ June 16, 1953